United States Patent
Hooper et al.

(10) Patent No.: US 6,205,860 B1
(45) Date of Patent: Mar. 27, 2001

(54) APPARATUS AND METHOD FOR DETERMINING A DIFFERENTIAL PRESSURE WITH RESPECT TO A REMOTE SITE

(75) Inventors: Randall T. Hooper; Garret Eugene Johnson Smith; Lawrence A. Shewell, all of Austin, TX (US)

(73) Assignee: Advanced Micro Devices, Sunnyvale, CA (US)

( * ) Notice: Subject to any disclaimer, the term of this patent is extended or adjusted under 35 U.S.C. 154(b) by 0 days.

(21) Appl. No.: 09/200,142

(22) Filed: Nov. 25, 1998

(51) Int. Cl.$^7$ ........................................................ G01L 7/00
(52) U.S. Cl. ................................................................ 73/714
(58) Field of Search ..................................... 73/1.57, 1.59, 73/714, 722, 728, 753; 417/63, 250, 326, 479; 364/571.01

(56) References Cited

U.S. PATENT DOCUMENTS 4,825,685 * 5/1989 Breimesser ............................ 73/1.59
5,974,855 * 11/1999 Seberger ............................... 73/1.59

* cited by examiner

*Primary Examiner*—William Oen
(74) *Attorney, Agent, or Firm*—James A. Harrison; Bruce E. Garlick

(57) ABSTRACT

A method of measuring the differential pressure of two fluid pressure sources includes connecting a manometer having a wireless transceiver for transmitting measured pressures to a remote location and connecting a second manometer to a second pressures source. The second manometer then is operable calculate differential pressure value based upon the measured and electromagnetically transmitted fluid pressure value. If two remote manometers are used and are both transmitting their measured fluid pressure values electromagnetically, the second manometer is operable to determine a differential fluid pressure for the two fluid whose pressures were electromagnetically transmitted. An apparatus includes a manometer having a electromagnetic transceiver for transmitting and receiving fluid pressure measurements. Accordingly, the manometer is capable of determining and displaying differential pressures relative pressures it measured and to pressures it received electromagnetically that were transmitted by other manometers.

11 Claims, 6 Drawing Sheets

| DIFFERENTIAL PRESSURE DATA TABLE | | | | |
|---|---|---|---|---|
| MEAS. EVENT | DATE/TIME | SOURCE 1 | SOURCE 2 | DIFFERENTIAL PRESSURE |
| N1 ⋮ ↓ NZ | mmddyy ⋮ ↓ mmddyy | X1 ⋮ ↓ X1Z | X2 ⋮ ↓ X2Z | X2 - X1 ⋮ ↓ X2Z - X1Z |
| 710 | 720 | 730 | 740 | 750 |

FIGURE 7

APPARATUS AND METHOD FOR DETERMINING A DIFFERENTIAL PRESSURE WITH RESPECT TO A REMOTE SITE

BACKGROUND

1. Field of the Invention

The present invention relates generally to integrated circuit manufacture and more particularly to a method of and apparatus for monitoring and controlling atmospheric pressure in a semiconductor processing facility.

2. Description of the Related Art

One trend in modern integrated circuit manufacture is to produce electronic devices on semiconductor substrates having feature sizes that are as small as possible. To produce a high density integrated circuit efficiently, semiconductor processes include the production of complex circuits on a single monolithic substrate, thereby allowing relatively large circuit systems to be incorporated on a single and relatively small die area. Further, many such die are commonly produced on a single wafer which, after production, is diced into a plurality of integrated circuits.

The benefits of high density circuits can only be realized if advanced processing techniques are used. For example, semiconductor process engineers and researchers often study the benefits of electron beam lithography and x-ray lithography to achieve the higher resolutions needed for submicron features. To some extent, wet etch has given way to a more advanced anisotropic (dry etch) technique. Each of these complex processes requires specialized equipment. Moreover, some processes even require specialized rooms (zones) or tools having specified environmental conditions. The specified environmental conditions include temperature, air quality (highly filtered air), humidity and atmospheric air pressure.

One reason it is very important to carefully monitor and control air pressure in the various zones and tools that are used in the fabrication process is to control the flow of impurities. The differential air pressure must be controlled between zones so as to prevent contamination flow to the more critical rooms or zones. Impurities are known to flow from a room having a higher atmospheric pressure to a room having lower atmospheric pressure. Thus, rooms are often kept at different atmospheric pressure levels relative to each other according to the importance of maintaining that room's (zone's) cleanliness. For example, a photolithographic zone must be kept free from contaminants introduced by the main fabrication room.

Similarly, the photolithographic zone and the main fabrication room should be kept at an air pressure level that precludes the flow of impurities from the polish zone (the dirtiest of the three zones). Therefore, the differential air pressure in the various rooms or zones must be monitored and controlled to prevent the flow of impurities from zone to zone.

In addition to monitoring differential air pressure in the various processing rooms or zones, differential air pressure is also often monitored for various pieces of equipment or tools that are used in the semiconductor manufacturing processes. However, it is difficult to consistently use the same reference point in calculating differential air pressures. For example, it is not desirable to merely use the air pressure of the room in which the machine resides as a reference pressure. One reason, as discussed before, is that the various rooms are maintained at different air pressure levels.

Moreover, the air pressure levels in the rooms can fluctuate. If an outside pressure is used, merely having a wind on one side of a building can cause it to have a higher atmospheric pressure on the windward side due to air pressure that may result from open doors or windows. As a result, one possible reference is to use the air pressure in an isolated room that is not used on a routine basis. By using such a room as a pressure reference, one can more effectively measure differential pressures through out a building. For example, a photolithographic zone is often kept at an atmospheric pressure that results in a differential static pressure set point that is equal to 0.1 inches of water in a water column. The main fabrication room is kept at a static pressure set point that is equal to 0.08 inches of water and the polishing zone is kept at a static pressure set point that is equal to 0.06 inches of water. Each of these static pressure set points is greater than the atmospheric pressure of an external reference. These slightly positive pressures relative to an outside reference are necessary to control the influx of contaminants. Because controlling air flow and air pressure are the primary methods of maintaining cleanliness in the fabrication facility, the proper levels of air pressure must be maintained to control air flow.

One difficulty in using a reference room for making differential pressure measurements is that it is necessary, in order to make real-time differential pressure measurements, to install and route a hose or a pipe (piping) from there to the point where a measurement is to be taken. Having to install piping presents many problems. First, is often necessary to route the piping long distances around or through obstacles. In some cases, is necessary to develop a hole in a wall of a room, such as the photolithographic zone, in which it is important to minimize the ways in which impurities may be introduced. Second, having to build a piping system to allow the measurements to be taken relative to an external reference room prevents flexibility because a meter has to be connected to the piping. Accordingly, it is not possible to take random measurements in various locations in the fabrication facilities. This lack of flexibility makes troubleshooting for potential problems in a fabrication process difficult.

One common piece of equipment that is used to monitor and control pressure is the manometer. A typical manometer includes two ports, namely, a high port and a low port, each being adapted to receive a conduit for carrying a fluid pressure. The value displayed on manometer display is the difference in pressure between the high port and the low port. A typical air pressure controller or manometer compares the difference in pressures of each area to be monitored in relation to the reference pressure. The controller also modulates devices known as dampers to maintain the desired setpoint. The modulated areas are maintained at a slightly positive pressure relative to outside to prevent "dirty air" from entering the building. Each modulated area is also pressurized, as discussed above, with respect to each other to control the flow of contaminants in the various zones, rooms or tools. As discussed previously, however, taking real time differential measurements are difficult using current equipment and systems.

One difficulty in taking real time differential measurements is that current systems require the routing of tubing or piping for carrying fluid pressures throughout the fabrication facility. Having to route tubing through a fabrication facility to allow real time differential pressure measurements can cause safety problems and can introduce impurities into a clean environment. Impurities can be introduced because long sections of tubing cannot be thoroughly cleaned internally. Moreover, penetrating walls to create apertures for the tubing can also cause leakage of conditioned and filtered air. Thus, there exists a need in the art for an improved system and method for measuring differential air pressures and for controlling the air pressure in the various rooms, zones and pieces of equipment.

SUMMARY OF THE INVENTION

The problems outlined above are in large part solved by the use of a new manometer that includes circuitry and interfaces that allow the manometer to receive, through at least one mechanical interface, an indication of the fluid pressure of a given location within a room, zone or piece of equipment, and also includes circuitry to transmit and receive measured fluid pressures over a wireless electromagnetic medium. Accordingly, selective placement of a plurality of the new manometers allows one to determine, at the location of either manometer, the differential fluid pressure levels on a real time basis. Additionally, the new manometer includes memory for storing a plurality of measurement events for maintaining a history log of measurements. The new manometer also includes an interface port for allowing the information stored in the memory to be uploaded to an external computer.

According to the present invention, a new manometer includes a pressure to current (p/i) or a pressure to voltage (p/v) converter that receives at least one air pressure indication by way of a conduit for carrying fluids. The manometer is coupled to receive a fluid pressure from the location that is to be measured. The p/i or p/v converter produces an electrical signal that is received by a processor or logic device (processor) of the manometer. The processor also is connected to receive or transmit an electromagnetic signal from or to a transceiver circuit that is operative to communicate with other transceivers of other manometers. The processor also is connected to a store or memory that is for storing measured fluid pressures and calculated differential pressures and also is connected to a display for indicating differential fluid pressure. Finally, the processor also is connected to an interface port for communicating with an external computer or device. Accordingly, the manometer can upload its stored information to an external device for analysis.

An inventive method includes placing a first manometer in a first location, placing a second manometer in a second location, transmitting a measured fluid pressure from the first to the second manometer, and storing and displaying the differential pressure of the first and second locations. These other aspects of the present invention will become apparent with further reference to the drawings and specification which follow.

BRIEF DESCRIPTION OF THE DRAWINGS

A better understanding of the present invention can be obtained when the following detailed description of the described embodiments is considered in conjunction with the following drawings, in which:

FIG. 7 is a table that illustrates the contents of a memory device used in conjunction with claimed invention.

DETAILED DESCRIPTION OF THE DRAWINGS

Figure 1:
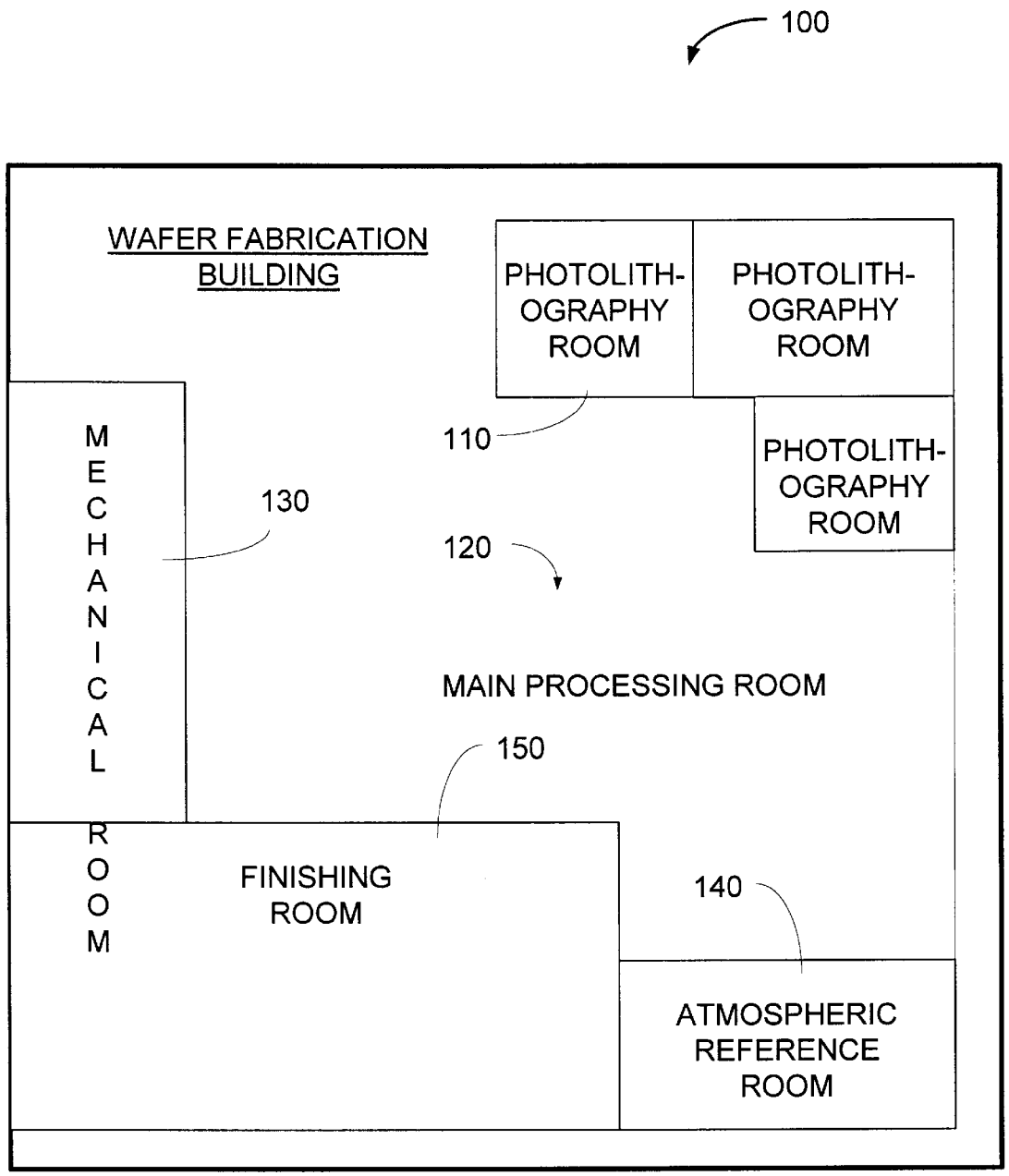
FIG. 1 is a functional block diagram of a wafer fabrication building.

FIG. 1 is a functional block diagram of a wafer fabrication building. Referring now to FIG. 1, a wafer fabrication building 100 includes a photolithography room 110, a main processing room 120, a mechanical room 130, an external reference room 140 and a finishing room 150. It is understood that a wafer fabrication building can contain one or more of each of these rooms as well as other rooms and that the example of FIG. 1 is for illustrative purposes only. Other elements of a wafer fabrication building sometimes include at least one fan tower and a long hallway connecting the finishing room to the remainder of the fabrication building. One purpose of separating the finishing room from other processing rooms is that the finishing room produces the most amounts of processing particles that could contaminate and damage a wafer under fabrication. Generally speaking, contaminants of all sorts, including those produced during the wafer fabrication processes, occasionally come into contact with the wafer as it is being produced. As a result, the fabricated wafer may be ruined or degraded. Over time, having impurities within a processing facility reduces yield rates and profitability. Is important, therefore, to produce semiconductor wafers in an environment that is as clean as possible. Because finishing rooms 150 produce the most amount of contaminants, they typically are separated from all other rooms or zones by walls and, sometimes, by at least one long hallway. If the air pressure of a finishing room is to be monitored using common pressure monitoring equipment, therefore, it is usually necessary to drill through the wall separating the finishing room 150 and the other rooms or zones to make differential pressure measurements.

Figure 2:
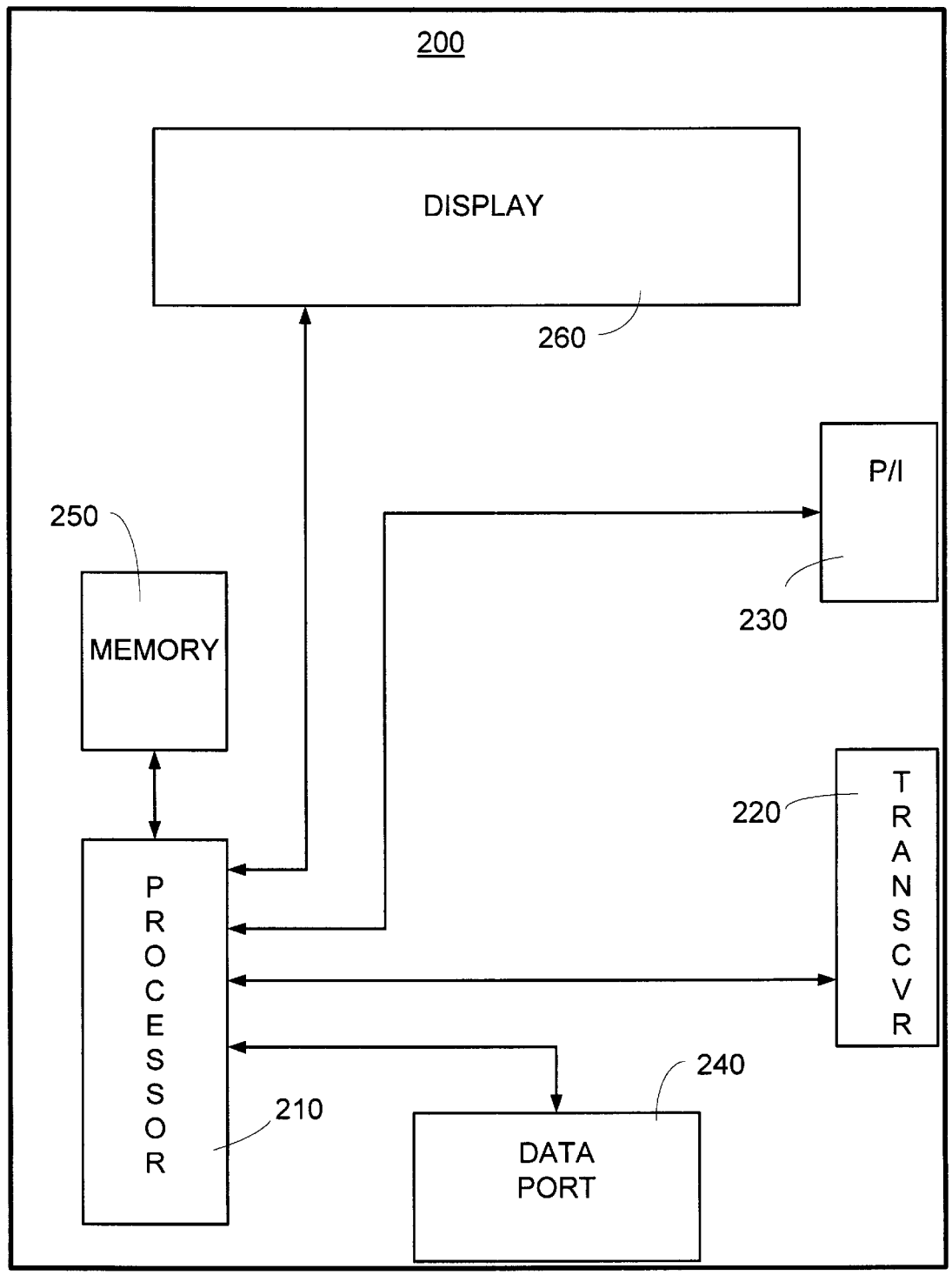
FIG. 2 is a functional block diagram of a manometer according to one embodiment of the present invention.

FIG. 2 is a functional block diagram of a manometer according to one embodiment of the present invention. The manometer 200 includes a processor 210, a transceiver 220, and a pressure to current converter port 230. The processor 210 of the present invention can comprise many different forms. For example, processor 210 can comprise the combination of a central processing unit and read-only memory which includes application programs that drive the central processing unit's operation. Alternatively, the processor 210 can comprise logic circuitry that is operable to respond to specified conditions. All forms of logic devices and processing units that may be used to control operation of a device including microprocessors, micro-controllers, digital signal processors, and other devices are included herein.

The transceiver can comprise anyone of many different wireless communication devices. For example, the transceiver can comprise bi-directional communication devices that operate in the electromagnetic frequency spectrum. For example, either radio-frequency or infrared communication devices may be used. In the described embodiment, however, radio-frequency devices are preferred because they have better range and because a clear optical path is not necessary for the receipt of a signal. While infrared signals can reflect off of surfaces to reach a destination point, they are more likely to suffer from interference, for example, multi-path fading, from an object in the transmission path. One additional consideration, however, is that the electromagnetic frequency must be one that does not interfere with the fabrication processes within the facility. Some frequencies are known to potentially interfere with certain processes. Those skilled in the art know whether the specific processes with which they work have certain radio-frequency interference issues.

As may be seen, processor 210 is connected to be in operative communication with transceiver 220 and with pressure to current converter port 230. Additionally, manometer 200 includes a data port 240 and a memory 250, each of which is coupled to be in operative communication with processor 210. Finally, manometer 200 includes a display 260 which is coupled to processor 210 and is for displaying the differential pressures thereon.

In operation, pressure to current converter port 230 receives at least one conduit for carrying a fluid having a pressure. Pressure to current converter port 230 is operable to receive a fluid having a pressure from the at least one conduit and to produce an electrical signal having a magnitude that is responsive to the received pressure. In the preferred embodiment, pressure to current converter port 230 produces a current whose amperage reflects the magnitude of the pressure. In alternative environments, a pressure to voltage converter port may be used in place of a pressure to current converter port. Like the pressure to current converter port 230, a pressure to voltage converter port produces an output voltage whose potential reflects the magnitude of the pressure.

As discussed above, pressure to current converter port 230 produces an electrical signal to processor 210. If pressure to current converter port 230 is capable of receiving at least two fluid conduits, each having a fluid pressure, then pressure to current converter port 230 is capable of producing at least two electrical signals to a processor 210 wherein each signal is reflective of each of the at least two fluid pressuress.

Additionally, processor 210 is coupled to receive electrical signals from transceiver 220 that reflect at least one fluid pressure value at a remote location. Processor 210 is operative to compare fluid pressure values reflected by the electrical signals received from the pressure to current converter port 230 to the fluid pressure values reflected by the signals received from the transceiver 220. Processor 210 also is operative to determine a differential pressure level between that which was detected by pressure to current converter port 230 and by a remote manometer 210 that transmitted a signal to transceiver 220 reflecting the fluid pressure at the location being measured by the remote manometer 210.

In general, processor 210 is operative to compare any two signals that reflect two fluid pressure values and to display a differential pressure. Accordingly, if processor 210 receives two electrical signals from pressure to current converter port 230 wherein each signal is reflective of a fluid pressure received at the pressure to current converter port 230, it is capable of producing a differential pressure value for the two fluids as can common manometers. Additionally, if processor 210 receives two electrical signals from transceiver 220, each of which reflects a fluid pressure as measured by one or more manometers 200, it is operative to display a differential pressure value on display 260. The display is formed of any known type of display including liquid crystal displays, light committing diode displays, and even a signal driven analog meter. Finally, processor 210 also is operative to calculate and display a differential pressure on display 260 for a fluid pressure received by pressure to current converter port 230 and for a fluid pressure measured by a remote manometer 200 that was in communication with transceiver 220.

Manometer 200 of FIG. 2 also includes a data port 240 and a memory 250. Memory 250 is for storing the differential pressures measured by manometer 200 in relation to a measurement event number. In the preferred embodiment of the invention, memory 250 also is for storing a numerical value reflective of each of the measured fluid pressures regardless of whether the measured fluid pressures were measured by it or by a remote manometer 200. The memory includes all types of programmable non-volatile memory devices including erasable programmable read-only memory, electrically erasable programmable read-only memory, flash memory, and various forms of optical memory storage devices. The memory may also included storage devices such as hard disk drives and floppy disk drives.

Data port 240 is for allowing the stored values in memory 250 to be output and uploaded to an external device. In the preferred embodiment, data port 240 is a serial digital port that is operable to communicate with a personal computer. In alternative environments, data port 240 comprises a port that is adapted to electrically communicate by way of a unique or select protocol with a specified device.

As may be seen therefore, if pressure to current converter port 230 measures a first fluid pressure and a remote manometer 200 measures a second fluid pressure, the remote manometer 200 also transmitting an electrical signal reflective of the second fluid pressure to transceiver 220, processor 210 is operative to calculate a differential pressure and to display the differential pressure upon display 260 while also storing the differential pressure within memory 250. In the preferred embodiment, processor 210 also stores a signal reflective of each measured fluid pressure and a measurement event number. The measurement event number is one that is used to allow a technician to identify the measurement events related to a stored differential pressure. Upon receiving an indication that an external device seeks to upload the data stored in memory 250, processor 210 also is operable to retrieve the stored data from memory 250 and to output the same stored data via data port 240. The indication may be originated by an operator through a switch depression or by a signal transmitted by an external device coupled to the manometer via data port 240. The indication may also be generated by internal logic or programming of the manometer.

Figure 3:
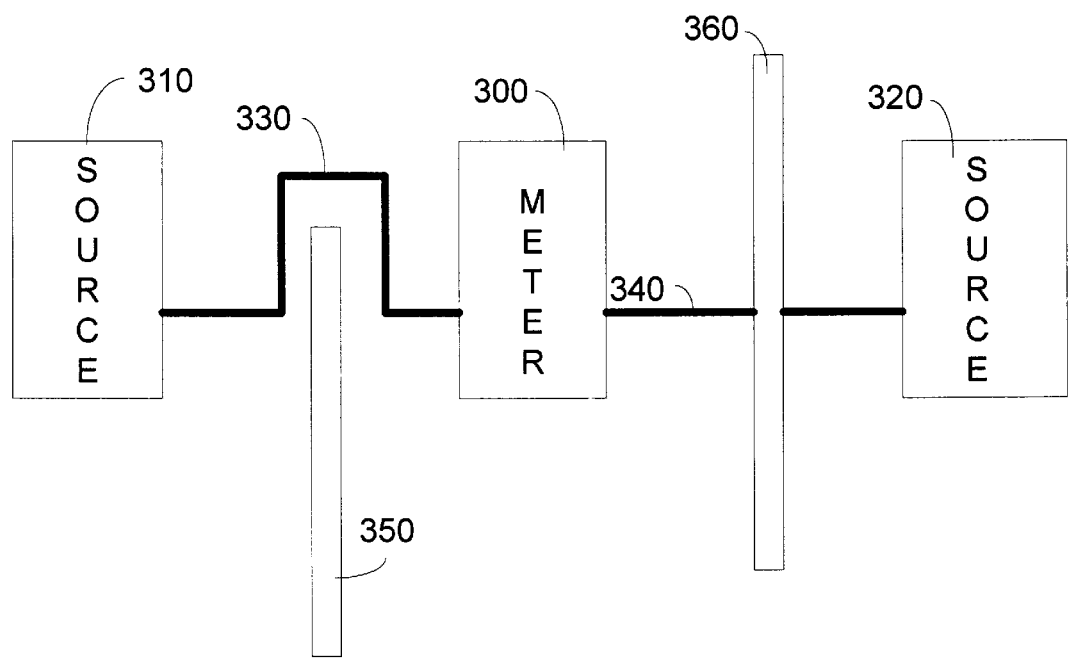
FIG. 3 is a functional block diagram illustrating a prior art system for taking the differential pressure measurements.

FIG. 3 is a functional block diagram illustrating a prior art system for taking the differential pressure measurements. Referring now to FIG. 3, it may be seen that a prior art manometer 300 is connected to a first pressure source 310 and to a second pressure source 320 by lines 330 and 340, respectively. As may be seen, line 330 is routed to go around an obstacle 350 while line 340 is routed through an aperture made within obstacle 360. In operation, manometer 300 displays a differential pressure that has been calculated from the pressures received from the first pressure source 310 and the second pressure source 320. As FIG. 3 suggests, the use of conduits to transmit fluid pressures from the first and second fluid pressure sources reduces flexibility because the manometer 300 must be connected to conduits 330 and 340. Additionally, the required formation of an aperture with an obstacle 360 for passage of the conduit 340 creates a path for impurities.

Figure 4:
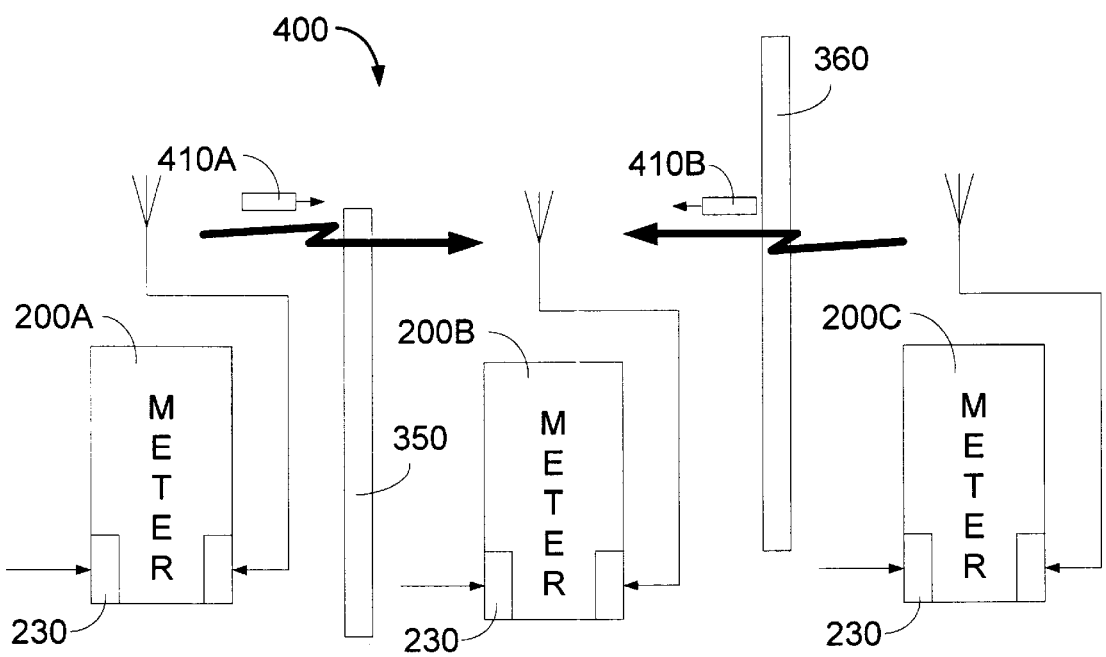
FIG. 4 is a functional block diagram illustrating a system for taking the differential pressure measurements from a plurality of locations according to a preferred embodiment of the present invention.

FIG. 4 is a functional block diagram illustrating a system for taking the differential pressure measurements from a plurality of locations according to a preferred embodiment of the present invention. Referring now to FIG. 4, a differential pressure measuring system 400 includes a first manometer 200A, a second manometer 200B and a third manometer 200C. Each of the manometers 200A, 200B and 200C are similar to manometer 200 of FIG. 2. It may be seen that manometer's 200A and 200C transmit information to manometer 200B. As may be seen in this figure, each of manometer's 200A and 200C transmit signals 410A and 410B, respectively, to manometer 200B. Signals 410A and 410B include information reflective of a pressure reading made by manometers 200A and 200C, respectively. Accordingly, manometer 200B is operable to receive signals 410A and 410B and to calculate, display and record a corresponding differential pressure.

As may be seen from referring to FIG. 4, the use of a pressure measuring system 400 allows one to take pressure measurements without the limitations faced by current systems. More specifically, piping does not have to be routed around obstacles 350 or through obstacles 360. Moreover, because manometer's 200A and 200C are not mechanically coupled to any piping, they may be placed wherever desired. Their placement does not affect the ability of manometer 200B to receive pressure measurements from a remote location so as to calculate a differential pressure.

Continuing to refer to FIG. 4, it may also be seen that manometer 200B includes a pressure to current converter port 230 for receiving a conduit carrying a pressurized fluid. Accordingly, manometer 200B also is operable to calculate a differential pressure for either one of the pressures reflected by signals 410A and 410B relative to the pressure received by pressure to current converter port 230. Whether manometer 200B calculates a differential pressure relative to signal 410A and the pressure received at pressure to current converter port 230 or to a differential pressure relative to signal 410B and the pressure received by pressure to current converter port 230 or the differential pressure relative to signal 410A and signal 410B depends on operator inputs or selections, or an internal logic or programming of manometer 200B.

Figure 5:
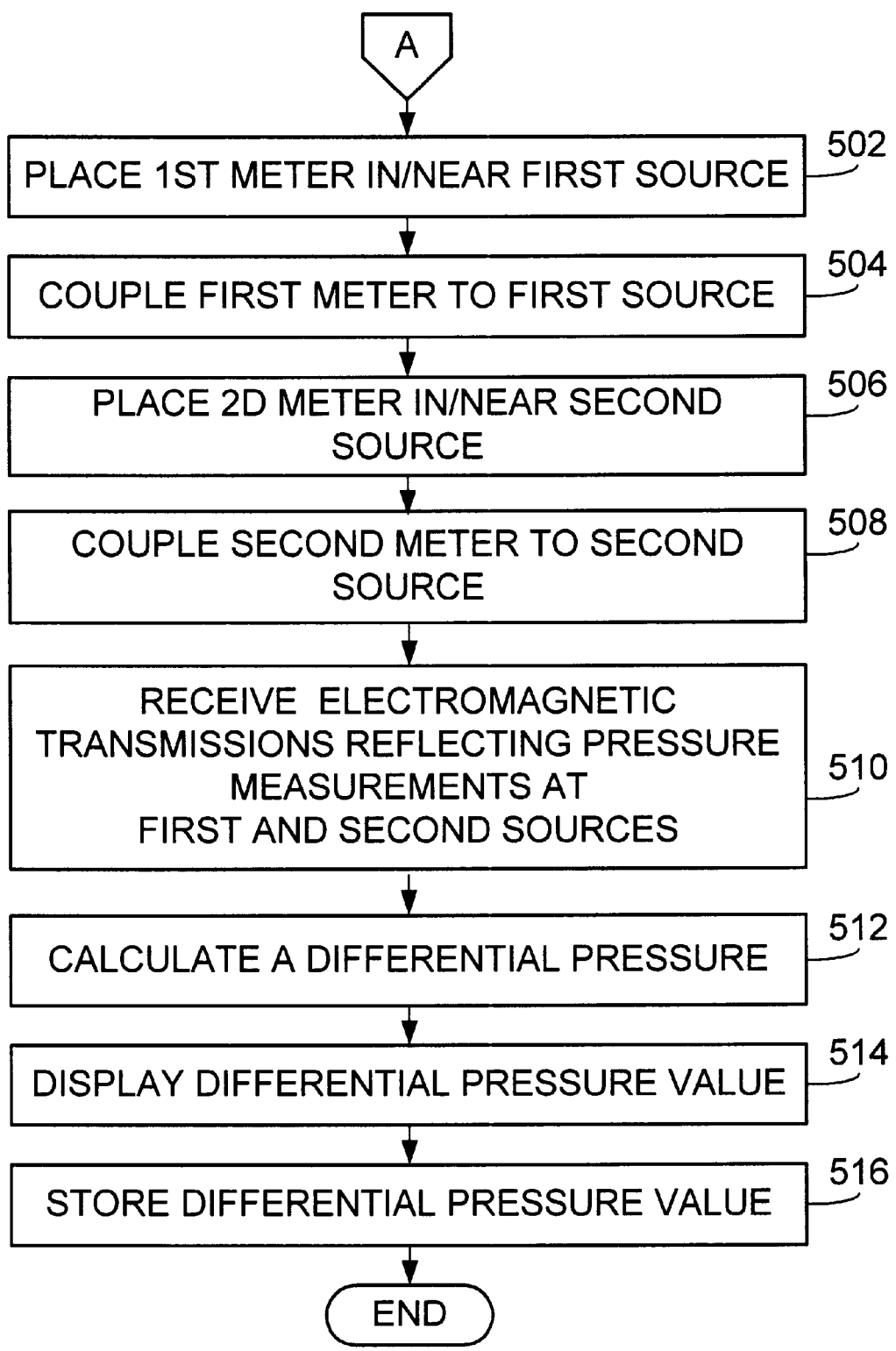
FIG. 5 is a logic flow diagram illustrating a method for using the inventive manometer according to a preferred embodiment of the invention.

FIG. 5 is a logic flow diagram illustrating a method for using the inventive manometer according to a preferred embodiment of the invention. Referring now to FIG. 5, a first manometer is placed at or near a first pressure source (step 502). A first manometer 200 is then mechanically coupled to an air pressure source that is to be measured (step 504). Thereafter, a second manometer 200 is placed in or near a second pressure source (step 506). The second manometer 200 is then mechanically coupled to an air pressure source that is to be measured (step 508). By way of example, a pitot tube may be placed into the area in which fluid pressure measurements are to be taken. The static and dynamic conduits of the pitot tube may then be connected to the manometer.

Once the first and second manometers 200 have been mechanically coupled to the fluid pressure sources that are to be measured, the systems are placed into an operative state so as to transmit electromagnetic signals having values that are reflective of a measured fluid pressure being measured. A third manometer electromagnetically then receives the electromagnetic transmissions transmitted by the first and second manometers reflecting pressure measurements at the first and second sources (step 510).

Once the third manometer has received the electromagnetic transmissions reflecting pressure measurements from the first and second sources, it calculates a differential pressure relative to the first and second fluid pressure sources (step 512). Once the differential pressure has been calculated, it is displayed (step 514) and is stored in a memory (step 516). In the preferred embodiment of the invention, the calculated differential pressure value is stored along with other information. This other information includes the received pressure values and a measurement event number.

Figure 6:
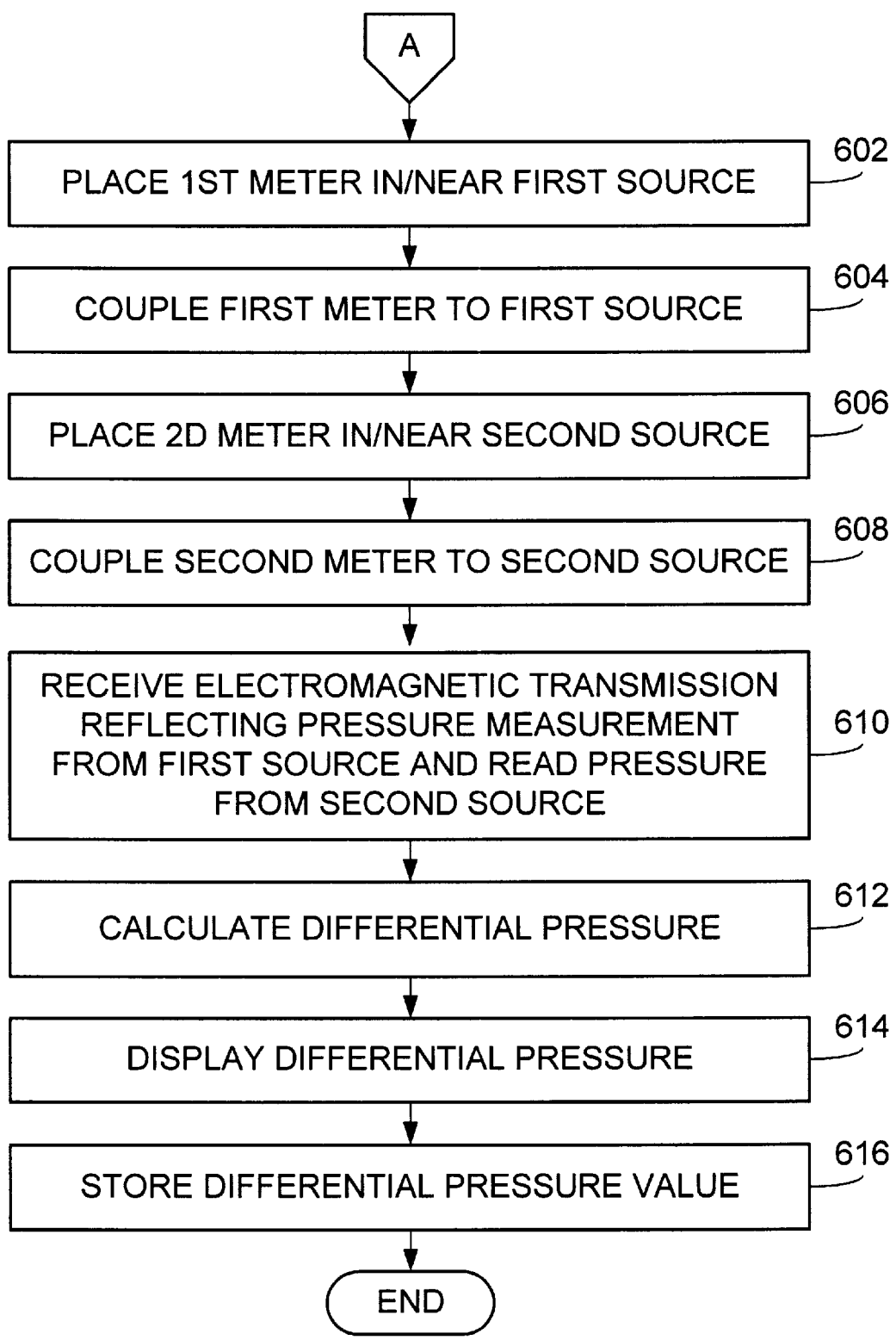
FIG. 6 is a logic flow diagram illustrating a method for using the inventive manometer according to a second preferred embodiment of the invention.

FIG. 6 is a logic flow diagram illustrating a method for using the inventive manometer according to a second preferred embodiment of the invention. Referring now to FIG. 6, a first manometer is placed at or near a first pressure source (step 602). The first manometer is then mechanically coupled to an air pressure source that is to be measured (step 604). Thereafter, the second manometer is placed at or near a second pressure source (step 606). The second manometer is then mechanically coupled to an air pressure source that is to be measured (step 608). As described in relation to FIG. 5, a pitot tube may be used.

Once the first and second manometer's have been mechanically coupled to the fluid pressure sources that are to be measured and the systems are placed into an operative state and the first manometer begins to transmit signals reflecting a measured pressure, the second manometer begins to communicate with and receive electromagnetic transmissions from the first manometer. The received electromagnetic transmissions are indicative of pressure measurements collected by the first manometer. At or nearly at the same time the first manometer transmits signals indicative of a measured fluid pressure, the second manometer also determines the fluid pressure of the pressure source to which it is coupled (step 610). Once the manometer has determined the fluid pressure of the pressure source to which is coupled and it has also received signals indicative of a measured fluid pressure transmitted by the first manometer, it calculates a differential pressure (step 612). Once the differential pressure has been calculated, it is displayed (step 614) and is stored in the memory along with other information (step 616).

FIG. 7 is a table that illustrates the contents of a memory device used in conjunction with claimed invention. Referring now to FIG. 7, it may seen that the table of FIG. 7 includes five columns that relate to fluid pressure measurements. In the table shown, the column shown generally at 710 is for storing a pressure measurement event number. In general, a pressure measurement event relative to a given manometer occurs when one of three scenarios occurs. The first scenario includes the manometer receiving an electromagnetic signal that indicates a measured pressure taken at a remote location by a remote manometer and the manometer also measuring a pressure. The second scenario includes the manometer receiving two electromagnetic signals, each indicating a measured pressure taken at different remote locations by two different remote manometers. The third scenario includes the manometer measuring the pressure from two pressure sources. Whenever a pressure measurement event occurs, the manometer stores a measurement event number in column 710.

In addition to storing the measurement event number in column 710, the date and time indications are stored in column 720. The manometer, in a preferred embodiment, also stores a first pressure value, a second pressure value, and a differential pressure. The first pressure value is stored in column 730, the second pressure value is stored in column 740, and the differential pressure, which is calculated, is stored in column 750. As is understood, the table of FIG. 7 reflects the types of information stored within the memory of the manometer according to one embodiment of the invention. In alternate embodiments of the invention, the information may be stored in different relative orders. Additionally, some of the stored information may be omitted. For example, in one embodiment of the invention, only a differential pressure value is stored. The received pressure values from the first second sources are not stored. Instead, a pressure reading taken by the manometer storing data the data as well as the differential pressure is stored. Accordingly, the pressure reading may readily be calculated as is known by those skilled in the art.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

We claim:

1. A pressure measuring device having two receptacles for receiving two conduits, each having a fluid with a pressure, and a display for displaying a differential pressure value, the pressure measuring device comprising:

circuitry for calculating differential pressure values;

at least one converter circuit connected to the circuitry for calculating differential pressure values, the converter circuit for producing a signal whose magnitude is reflective of a measured pressure; and a transceiver for receiving electromagnetic transmissions reflecting a pressure value that was measured at a remote site, the transceiver being coupled to the circuitry for calculating differential pressure.

2. The pressure measuring device of claim 1 further including a memory for storing pressure information.

3. The pressure measuring device of claim 2 further including logic circuitry for controlling and selecting pressure information for storing in the memory.

4. The pressure measuring device of claim 3 wherein the logic circuitry causes a differential pressure value to be stored within the memory.

5. The pressure measuring device of claim 3 wherein the logic circuitry causes a measurement event number to be stored within the memory.

6. The pressure measuring device of claim 5 wherein the logic circuitry causes a differential pressure to be stored within the memory in relation to the measurement event number.

7. The pressure measuring device of claim 3 wherein the logic circuitry causes a first pressure value to be stored within the memory in relation to the measurement event number.

8. The pressure measuring device of claim 3 wherein the logic circuitry causes a second pressure value to be stored within the memory in relation to the measurement event number.

9. The pressure measuring device of claim 3 further including a data port for uploading pressure information to an external device coupled to the data port.

10. A pressure measuring device having two receptacles for receiving two conduits, each conduit carrying a fluid having a pressure, and a display for displaying a differential pressure value, the pressure measuring device comprising:

circuitry for calculating differential pressure values;

at least one converter circuit connected to the circuitry for calculating differential pressure values, the converter circuit for producing a signal whose magnitude is reflective of a measured pressure;

a transceiver for receiving electromagnetic transmissions reflecting a pressure value that was measured at a remote site, the transceiver being coupled to the circuitry for calculating differential pressure;

memory coupled to the circuitry for calculating, the memory for storing pressure information; and a data port for uploading pressure information to an external device coupled to the data port.

11. The pressure measuring device of claim 10 further including logic circuitry wherein the logic circuitry causes a first pressure value, a second pressure value, a differential pressure value and a measurement event number to be stored within the memory in relation to the measurement event number.

* * * * *